(12) United States Patent
Leve

(10) Patent No.: US 6,513,220 B2
(45) Date of Patent: Feb. 4, 2003

(54) METHOD OF ATTACHING AN ELECTRONIC IDENTIFICATION DEVICE TO A VEHICLE, AND IDENTIFICATION DEVICE

(75) Inventor: Ludger Leve, Rahden (DE)

(73) Assignee: Harting Automotive GmbH & Co. KG (DE)

( * ) Notice: Subject to any disclaimer, the term of this patent is extended or adjusted under 35 U.S.C. 154(b) by 0 days.

(21) Appl. No.: 09/935,848

(22) Filed: Aug. 23, 2001

(65) Prior Publication Data

US 2002/0050522 A1 May 2, 2002

(30) Foreign Application Priority Data

Sep. 1, 2000 (DE) .......................... 100 43 168

(51) Int. Cl.⁷ .............................. B23P 17/00
(52) U.S. Cl. ......................... 29/423; 235/488; 29/458
(58) Field of Search .................. 235/488, 487, 235/489; 29/423, 458

(56) References Cited

U.S. PATENT DOCUMENTS

| | | | |
|---|---|---|---|
| 4,523,088 A | * | 6/1985 | Utsch |
| 4,590,654 A | * | 5/1986 | Kajiura |
| 4,611,380 A | * | 9/1986 | Abe et al. |
| 4,837,904 A | * | 6/1989 | Abe et al. |
| 4,941,182 A | * | 7/1990 | Patel |
| 5,392,049 A | * | 2/1995 | Gunnarsson |
| 6,259,056 B1 | * | 7/2001 | Cowden |

FOREIGN PATENT DOCUMENTS

DE    20 03 897    1/1970    ........... G07C/11/00

OTHER PUBLICATIONS

"Identifikation mit elektronischen Datentragern", May, 1997.
"Transponder—der andere Barcode", Logistik im Unternehmen 12 (1998), Nr. 9—Sep.
"Sicher identifiziert", Logistik Nr. 10, 1999.

* cited by examiner

*Primary Examiner*—Gregory M. Vidovich
*Assistant Examiner*—Steven Blount
(74) *Attorney, Agent, or Firm*—Hayes Soloway P.C.

(57) ABSTRACT

The invention relates to a method of attaching an electronic identification device having an electronic identification means to a vehicle body, which comprises the following steps: a) prior to at least one of the steps painting and galvanizing the body, the identification device is attached to the body by means of a spacer in such a way that the identification device is spaced away from the body; b) following painting and galvanizing, the identification device is permanently arrested on the body without being detached in the meantime from the body. The invention further relates to an electronic identification device for being attached to a vehicle body by means of the method proposed.

9 Claims, 4 Drawing Sheets

METHOD OF ATTACHING AN ELECTRONIC IDENTIFICATION DEVICE TO A VEHICLE, AND IDENTIFICATION DEVICE

TECHNICAL FIELD

The invention relates to a method of attaching an electronic identification device having an electronic identification means to a vehicle body.

The invention further relates to an electronic identification device for being attached to a vehicle body by the method proposed.

BACKGROUND OF THE INVENTION

During assembling the vehicle, vehicle bodies are to be identifiable already in the factory of the vehicle manufacturer at any point in time and in a definite manner. It is for this reason that hitherto so-called "bar codes" are attached to the body directly after their manufacture. These are accommodated at places which in some cases are difficult to access, and they have to be read in by a manual scanner in each assembling station. In order to simplify this process of reading-in, there is the desire of employing an electronic identification device which for instance comprises an identification means in form of a memory chip (TAG), in order to make possible a remote inquiry by means of, for example, a transponder for identifying the body.

Such an employment of an electronic identification device, however, has not been realized up to now, because the body has to pass through various steps of manufacture, among other things e.g. galvanizing or painting, in which an electronic identification device would only be impeding.

BRIEF SUMMARY OF THE INVENTION

Therefore, it is the object of the invention to provide a method with which employing an electronic identification device in the process of manufacture of the body is made possible.

This is achieved in a method of attaching an electronic identification device having an electronic identification means to a vehicle body, which comprises the following steps:

a) prior to at least one of the steps painting and galvanizing the body, the identification device is attached to the body by means of a spacer in such a way that the identification device is spaced away from the body;

b) following painting and galvanizing, the identification device is permanently arrested on the body without being detached in the meantime from the body.

The attachment method according to the invention provides for that immediately after its manufacture—i.e. prior to galvanizing/painting—the body is permanently connected with the identification device, with the spacer being in use only temporarily, namely among other things during the galvanizing/painting process, for preventing that the identification device contacts the body which would render a complete painting or galvanizing of the body impossible. Only the small spacer is in contact with the body. Subsequently, however, the identification device is permanently attached to the body, preferably in a non-detachable manner, which means that detaching could only be done by destroying.

In case that the identification device consists of several parts detachably connected with each other, the identification means itself is permanently arrested on the body in step a).

The spacer is, for example, a plastic band or a plastic cord which has a certain resistance to bending. Further, the identification device is attached to the body at such a place that it hangs down from the body during painting. The plastic band or plastic cord has such a resistance to bending that it prevents the identification device from striking against the body when the latter moves during painting or galvanizing.

One embodiment makes provision that in step b) the identification means is arrested on the body by means of a one-way latching connection. The one-way latching connection is to prevent a detaching of the arresting, at the same time, however, make possible a quick arresting.

In order to reduce the costs for the identification device it is provided for that an identification means, which is of a very simple and low-cost structure, is detachably coupled with a transponder which is part of the identification device. The unit thus produced is attached to the body in step a). The transponder, which may be relatively expensive and may also have a larger volume, is preferably separated from the identification means after manufacture of the vehicle and is reusable.

An expendable protective housing is to shield the transponder towards outside, in particular during galvanizing or painting. In a step c), the protective housing and the transponder are removed from the identification means, and the transponder is reused by it being placed on another identification means and being coupled-with the latter.

As already mentioned, the invention also relates to an electronic identification device adapted to be attached to a vehicle body by means of the mentioned method, with the vehicle body having a mounting hole for attaching the identification device. The identification device according to the invention has an identification means and a spacer which temporarily links the identification device with the body. The spacer has an attachment, i.e. an attachment means, for arresting the spacer on the body. There is also provided a non-detachable attachment on the identification device for permanently arresting the identification device directly on the body. The identification device, thus, has two attachments which are used successively and which each provide for a different distance of the identification device from the body. When the spacer is in use, the remainder of the identification device does not contact the body. Afterwards, however, the identification device can be permanently and directly arrested on the body by means of the non-detachable attachment, without previously detaching this device from the body.

If a one-way latching connection is provided, by means of which the identification device—preferably the identification means itself—is permanently arrested on the body, this latching connection may be configured e.g. as a bayonet lock. The bayonet lock allows a quick coupling action between identification device and body by pressing and rotating. The bayonet lock consists of teeth on the edge surrounding the mounting hole and of counter teeth on the identification means; here, teeth and counter teeth should be adapted to each other such that they mutually latch with each other after arresting and prevent the identification means from moving in the direction of detachment.

If the teeth and counter teeth are adapted to each other such that they rest against each other with an axial prestress after having been latched, then the identification means lies against the body with an axial prestress and can not rattle.

According to the preferred embodiment the identification device has a transponder which is detachably connected with the identification means and provided for reading out the data on the identification means, as well as a protective housing surrounding the transponder, these parts forming a unit. The protective housing is connected with the identification means preferably by means of a screw-and-latch connection, so that the transponder is disposed between the protective housing and the identification means. In this arrangement, the screw-and-latch connection and the one-way latching connection in form of the bayonet lock are designed such that these two connections have opposite directions of rotation for closing. With this, the identification device can be inserted in the mounting hole and turned in one direction to achieve latching, and subsequently the protective housing is simply turned in the opposite direction to detach the protective housing together with the transponder from the identification means.

So that no sabotage can be practiced during the passing of the vehicle in the factory of the vehicle manufacturer, the protective housing can not be detached from the identification means, for example to remove the transponder, without destruction. A latching tab and a nose are adapted to each other such that the latching tab is destroyed when the protective housing is removed from the identification means.

DETAILED DESCRIPTION OF THE PREFERRED EMBODIMENTS

Figure 1:
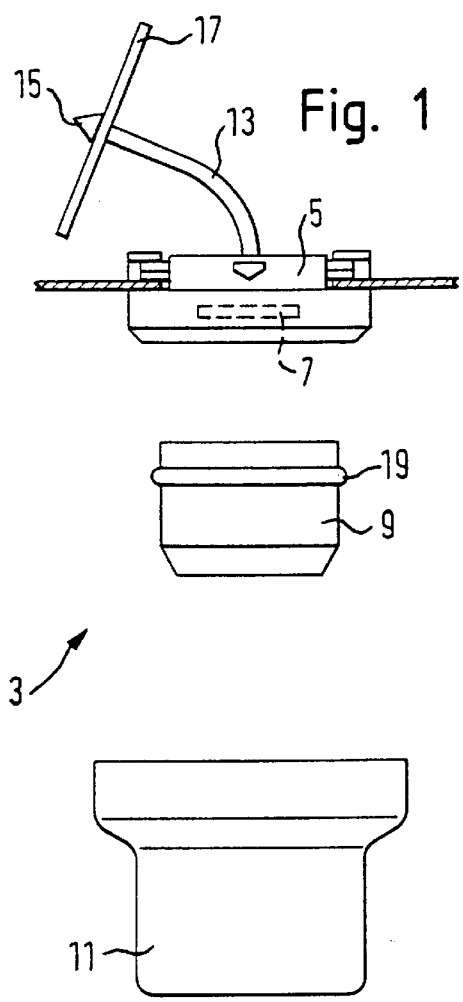
FIG. 1 shows an exploded view of an identification device according to the invention for vehicle bodies.

In FIG. 1 there is illustrated an electronic identification device which already immediately after the manufacture of a vehicle body is fastened thereto in the factory of the manufacturer. The identification device has the reference numeral 3 and consists of an electronic identification means 5 having a memory chip 7 on which vehicle data are stored, a transponder 9 which can be detachably coupled with the identification means 5, and a cup-shaped, expendable protective housing 11. Further, the identification device is provided with a spacer in the form of a plastic cord or band 13 resistant to bending, which is directly attached to the identification means 5 in a non-detachable manner. In the context of this invention, the term "non-detachable" is intended to mean that parts can only be detached from each other by destruction. A hook-like tip is formed on the free end 15 of the plastic band, this tip having been inserted in an opening of a flexible plastic disc 17, so that these two parts likewise are non-detachably connected with other. The disc 17 can not be moved relative to the plastic band 13 either, because directly adjacent to the hook-like point there is provided a groove (not shown) in the plastic band 13, where the disc latches in place.

Figure 2:
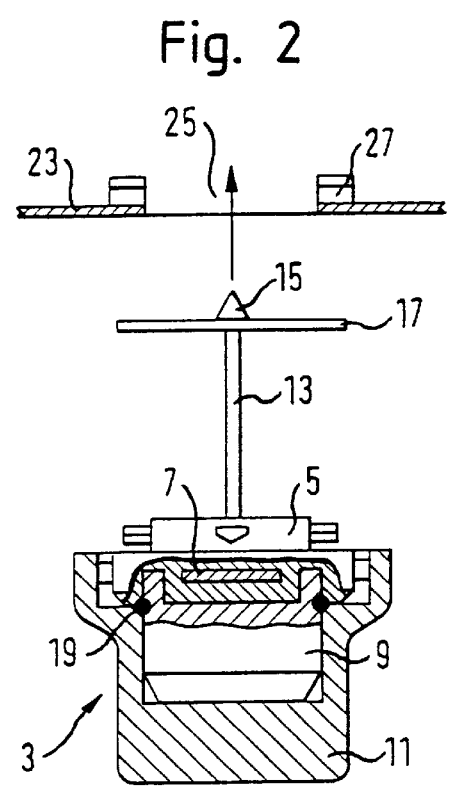
FIG. 2 shows a longitudinal sectional view of the identification device according to the invention of FIG. 1, shortly before it, being attached to a vehicle body.

The parts shown in FIG. 1 constitute a preassembled unit, namely the identification device 3 which is shown in the mounted state in FIG. 2. It is to be seen that the protective housing 11 surrounds the transponder 9 and that the upper, open side of the protective housing 11 is closed by the identification means 5, preferably hermetically sealed. An O-ring 19 provided on the circumference of transponder 9 serves to arrest the latter in the protective housing 11 and at the same time for sealing purposes. In the mounted state, the transponder 9 is connected with the identification means, so that a remote inquiry of the data stored on the identification means is possible. The transponder 9 works preferably with an integrated battery, in order to be able to transmit data across larger distances.

Figure 8:
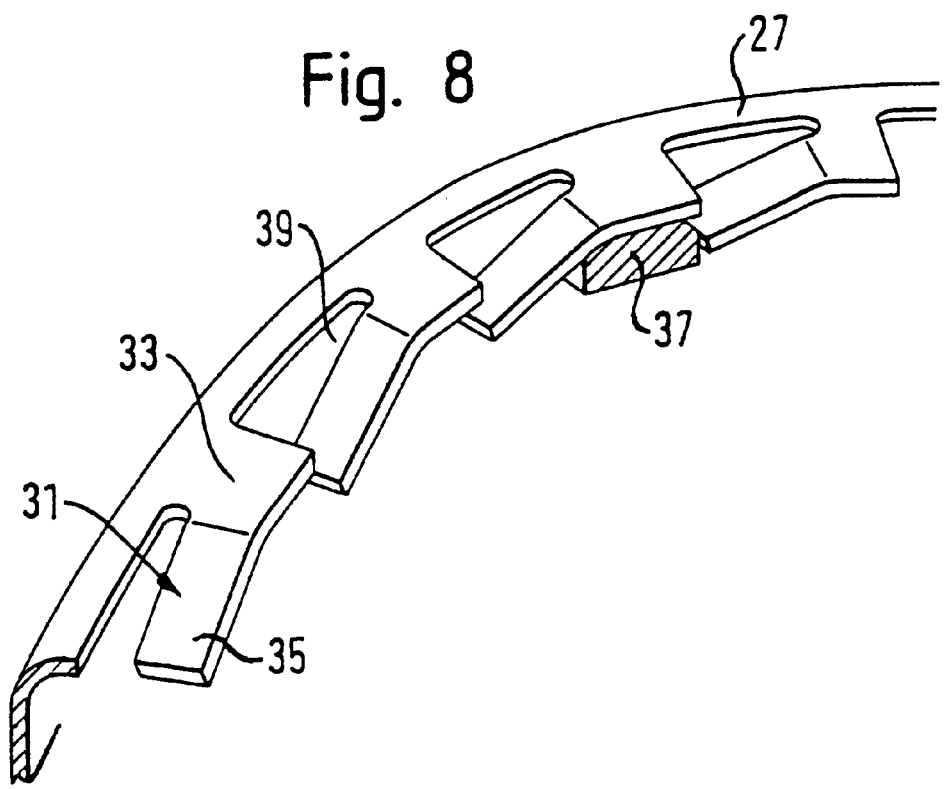
FIG. 8 shows a scaled-up segment of the edge delimiting the mounting hole in the body.
Figure 9:
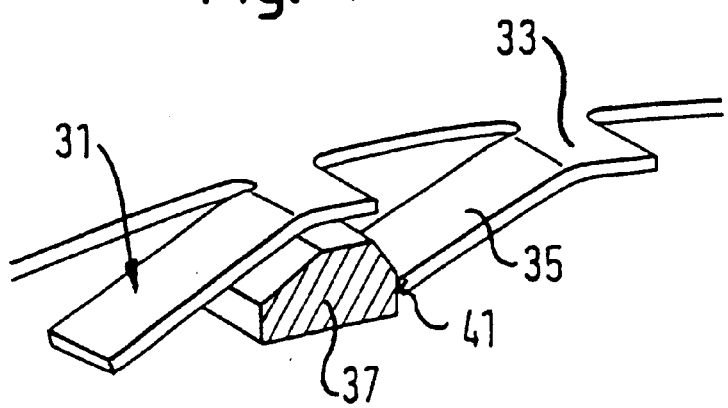
FIG. 9 shows a perspective detail view of the edge of FIG. 8.

In FIG. 2 there is shown the vehicle body only section-wise as a metal sheet 23 having a mounting hole 25, 27 designates the edge surrounding the mounting hole 25 on the vehicle body 23 which edge is shown in detail in FIGS. 8 and 9 and, thus, is shown simplified in FIGS. 1 to 4 as a block.

According to the invention, the identification device 3 is loosely attached to the vehicle body as early as possible, in any case prior to galvanizing and painting, by the flexible disc 17 being forced through the mounting hole 25 with elastic deformation of this disc. After having been put through the mounting hole 25, the disc 17 loosely rests at the edge 27.

Figure 3:
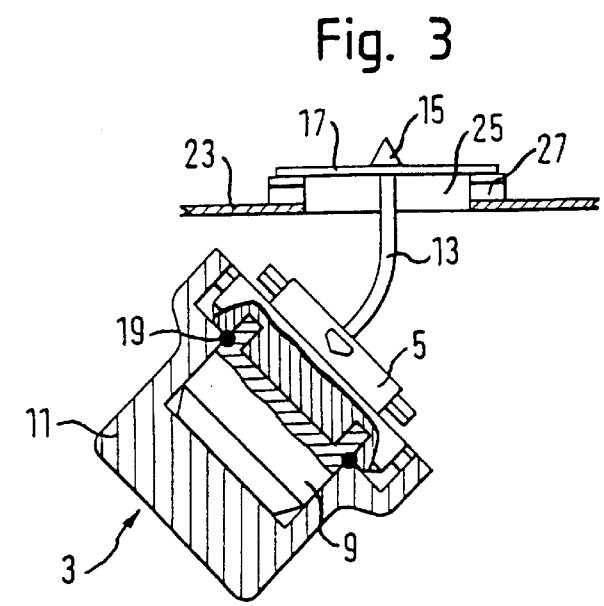
FIG. 3 shows the identification device according to the invention, after having been attached to a vehicle body which is not yet galvanized and not yet painted and galvanized, too.

The mounting hole 25 is provided at such a place on the vehicle body 23 that the identification device, during galvanizing and painting, hangs down as shown in FIG. 3, without contacting the body 23. The plastic band 13 which has a certain resistance to bending prevents the identification device 3 from swinging to such an extent that the latter contacts the body 23.

Due to the spacer in the form of the plastic band 13, the unit of protective housing 11, transponder 9 and identification means 5 is spaced away from the body 23, so that the latter may be completely galvanized and painted even in the region of the mounting hole 25. Merely the support points for the disc 17 are possibly not painted or galvanized and will have to undergo a secondary treatment, if necessary.

Figure 4:
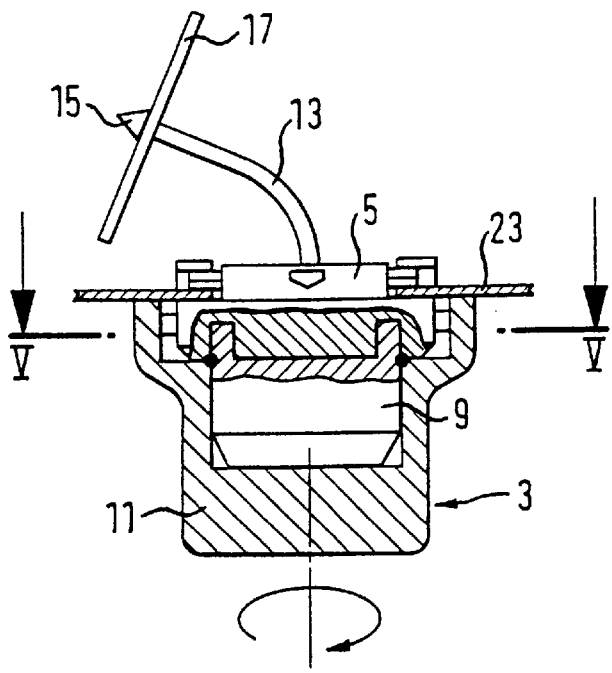
FIG. 4 shows the identification device according to the invention after having been arrested on a painted and galvanized vehicle body.

After galvanizing and painting, however, the identification means 5 is permanently and fixedly attached to the body 23, as is shown in FIG. 4, i.e. by means of a one-way and one-time latching connection (first latching connection) which is configured as a-special bayonet lock. The latching connection is to be seen in FIGS. 8 and 9. The latching connection has teeth 31 provided on the entire edge 27 of the mounting hole 25, which adjoin each other circumferentially and have the shape of punched-out, deformed and radially inwardly protruding metal tabs; these tabs essentially have two sections, namely a not deformed section 33 protruding radially inwards and an axially bent section, also termed as slope 35, which leads away from section 33. A plurality of counter teeth 37 are formed on the identification means, of which only one counter tooth 9 is shown in FIGS. 8 and 9.

For arresting the identification means 5, the housing 11 may be grasped by hand and be pressed against the body 23, so that the counter teeth 37 penetrate the openings 39 formed by the slopes bent downwards with regard to FIGS. 8 and 9.

Next, the counter teeth will press against the slopes 35 and press the latter, elastically downwards. The counter teeth 37 are moved under the section 33 by rotating the identification device in the anti-clockwise direction. After the counter tooth 37 has left the slope 35, the latter latches in place with an upward movement and lies, as can be seen in FIG. 9, on the rear side 41 of the corresponding counter tooth 37 and prevents a movement in the clockwise sense for detaching the connection.

In the arrested state, the identification means is seated on the edge 27 in such a manner that the counter tooth 37 slightly presses upwards, whereby the identification means 5 is attached to the body 23 with an axial prestress.

It would theoretically be possible, of course, to free the path for the counter teeth 37 by bending the slopes 35, but the body is configured such and the mounting hole is arranged at such a place that the slopes 35 are not accessible from the rear side, whereby a non-detachable connection is established.

Figure 5:
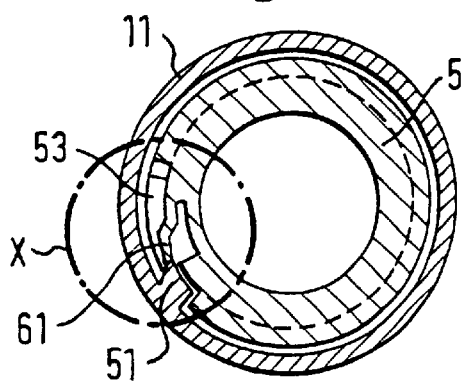
FIG. 5 shows a sectional view through the identification device according to line V—V in FIG. 4.
Figure 7:
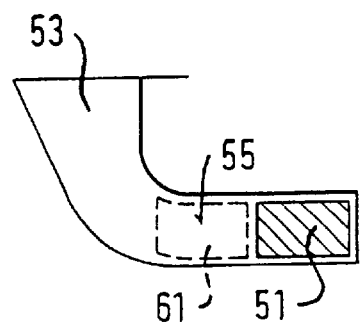
FIG. 7 shows a developed view of the section along line VII—VII in FIG. 6.
Figure 6:
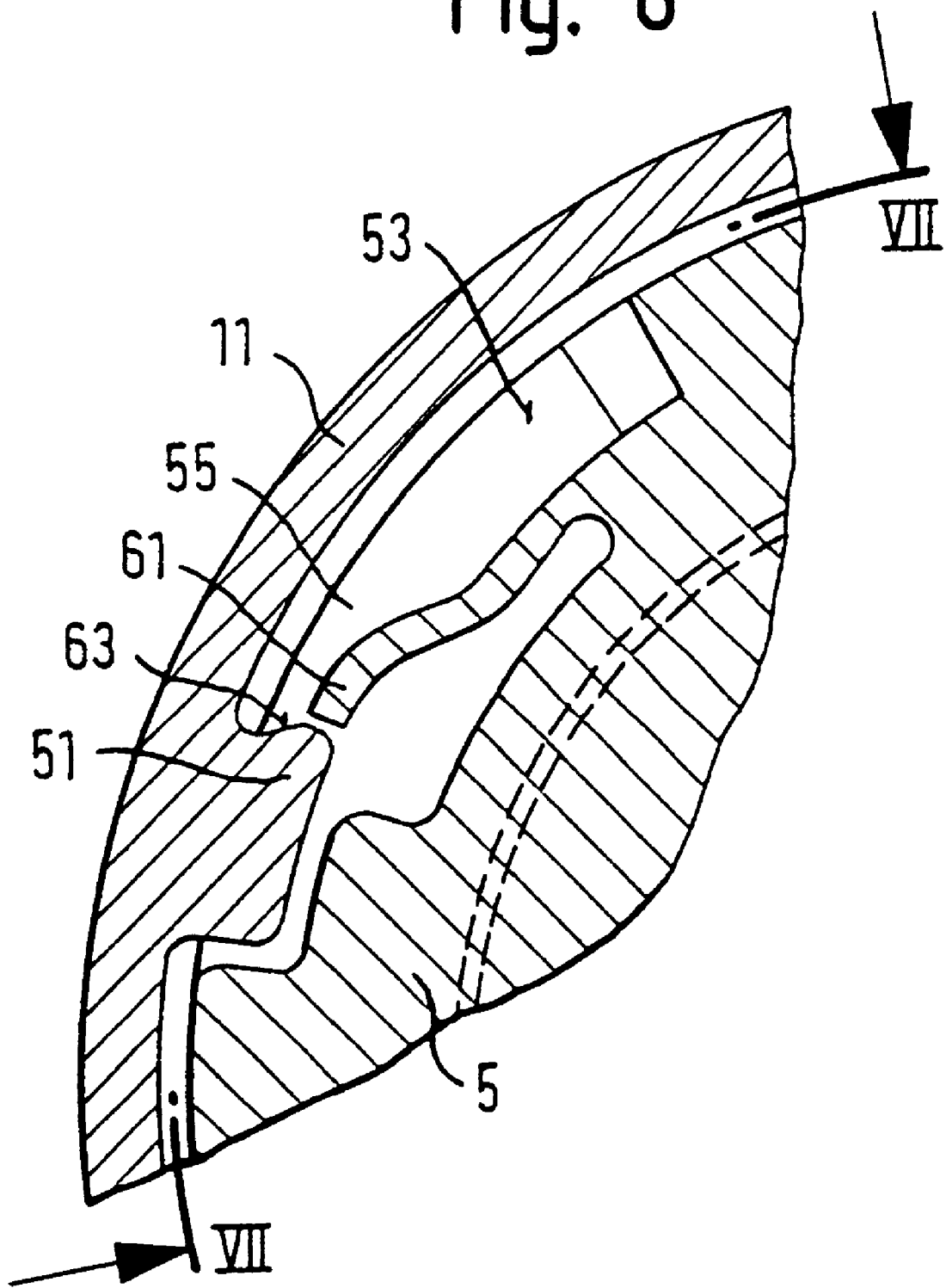
FIG. 6 shows a scaled-up view of the framed region referenced by X in FIG. 5.

The protective housing, too, is coupled with the identification means 5 by means of a second latching connection. This connection is likewise a bayonet type lock, but in the following this will be termed more generally as screw-and-latch connection. As it is to be seen in FIGS. 5 and 6, this connection comprises a radially protruding nose 51 on the inner side of the protective housing 11, which nose can be introduced in an adjacent receiving pocket 55 via a pocket 53 (see FIG. 7) in the identification means, as is shown in FIG. 7. A molded-on, elastic latching tab 61 projects from the inner side of the pocket 53 into the receiving pocket 55. The tab 61 has to yield radially inwards upon screwing in the nose 51, in order to free the path for the nose 51. When the nose 51 has passed the latching tab 61, the latter snaps back into the latching position shown in FIG. 6 and prevents a detachment of the housing 11 from the identification means 5. The screw-and-latch connection shown in FIG. 6 and the bayonet lock shown in FIGS. 8 and 9 have opposite directions of rotation for closing. The identification means 5 is firstly attached to the body by it being screwed in in one direction. Later, the protective housing 11 is rotated in the direction of detachment so that the latching tab 61 travels outwards due to a slope surface 63 on the nose 51 and is destroyed. With this, the housing 11 is able to be detached from the identification means 5, and it is not possible any longer to non-detachably attach the used housing to the identification means.

The vehicle together with the identification means 5 will now leave the vehicle manufacturer, whilst still having the option of attaching a transponder to the identification means at a later point in time, for remotely inquiring the latter.

The transponder 9 is removed from the housing 11 and is reused within the factory. Merely the housing 11 remains to be discarded.

Preferably, a so-called TAG is used as the identification means.

What is claimed is:

1. A method of attaching an electronic identification device, having vehicle body electronic identification means, to a vehicle body, said method comprising the following steps:
    a) prior to at least one of the steps painting and galvanizing said body, said identification device is attached to said body by means of a spacer in such a way that said identification device is spaced away from said body;
    b) following painting and galvanizing, said identification device is permanently arrested on said body without being detached in the meantime from said body.

2. The method according to claim 1, wherein in step a) said identification means is connected to said body.

3. The method according to claim 1, wherein there are provided a plastic member resistant to bending and an attachment means which is inserted in step a) into a mounting hole in said body, said plastic member acting as a spacer.

4. The method according to claim 1, wherein in step b) said identification means is arrested on said body by means of a one-way latching connection.

5. The method according to claim 1, wherein in step b) said identification means is non-detachably arrested on said body.

6. The method according to claim 1, wherein said identification means comprises a transponder provided for reading out data stored on said identification means and detachably coupled with said identification means, said transponder and said identification means forming a unit which is attached to said body in step a).

7. The method according to claim 6, wherein said identification means comprises an expendable protective housing for said transponder which surrounds the latter, and wherein in a step
    c) said protective housing and said transponder are removed from said identification means, said transponder being reused by it being coupled with other identification means.

8. The method according to claim 1, wherein said electronic identification means includes a memory chip.

9. The method according to claim 1, wherein said identification device is attached to said body at such a place that it hangs down from said body during painting.

* * * * *